United States Patent [19]
Engelke et al.

[11] Patent Number: 5,604,786
[45] Date of Patent: Feb. 18, 1997

[54] TELEPHONE WITH UNIFIED FEATURES FOR HEARING AND DEAF USERS

[75] Inventors: Robert M. Engelke; Kevin R. Colwell, both of Madison; Ronald W. Schultz, Middleton; Troy Vitek, Madison, all of Wis.

[73] Assignee: Ultratec, Inc., Madison, Wis.

[21] Appl. No.: 258,044

[22] Filed: Jun. 10, 1994

[51] Int. Cl.[6] .................................................. H04M 11/00
[52] U.S. Cl. .................................................. 379/52; 379/96
[58] Field of Search .................................. 379/52, 38, 45, 379/93, 94, 95, 96, 97, 98

[56] References Cited

U.S. PATENT DOCUMENTS

| | | | |
|---|---|---|---|
| 4,503,288 | 3/1985 | Kessler | 379/96 |
| 4,839,919 | 6/1989 | Borges et al. | 379/96 |
| 4,959,847 | 9/1990 | Engelke et al. | 375/121 |
| 5,081,673 | 1/1992 | Engelke et al. | 379/52 |
| 5,086,453 | 2/1992 | Senoo et al. | 379/93 |
| 5,121,421 | 6/1992 | Alheim | 379/52 |
| 5,325,417 | 6/1994 | Engelke et al. | 379/52 |
| 5,327,479 | 7/1994 | Engelke et al. | 379/52 |

Primary Examiner—Jason Chan
Attorney, Agent, or Firm—Quarles & Brady

[57] ABSTRACT

A unified TDD and telephone incorporate intelligent mode switching to permit users of either device to use the integrated unit with the other features remaining largely invisible by sensing various signals including the removal of the handset or the turning on and off of the TDD device to determine the likely mode of a transmission and the detection of text to determining the likely mode of the receive text. This intelligent mode conversion includes a voice carryover mode in which text and voice may both be transmitted.

10 Claims, 3 Drawing Sheets

TELEPHONE WITH UNIFIED FEATURES FOR HEARING AND DEAF USERS

CROSS-REFERENCE TO RELATED APPLICATIONS

This application is a continuation-in-part of application Ser. No. 08/842,943 now issued as U.S. Pat. No. 5,351,288 on Sep. 27, 1994, entitled "Voice Bridge For A Relay Center", hereby incorporated by reference and which was a continuation-in-part of application Ser. No. 07/616,720 filed Nov. 6, 1990, now U.S. Pat. No. 5,081,673, which was in turn a continuation of application Ser. No. 07/255,357 filed Oct. 11, 1988, now abandoned. This application is also a continuation-in-part of U.S. application Ser. No. 08/129/894 now issued as U.S. Pat. No. 5,432,837 on Jul. 11, 1995, entitled "Telecommunication Device For The Deaf With Automatic Transmission Capability" hereby incorporated by reference, and which is a continuation-in-part of U.S. application Ser. No. 07/886,552 filed May 20, 1992, and a continuation-in-part of U.S. application Ser. No. 07/886,553 filed May 20, 1992.

FIELD OF THE INVENTION

The present invention relates to the field of telecommunication devices for the deaf (TDDs), and in particular, relates to a TDD permitting ready use by either the hearing or deaf.

BACKGROUND OF THE INVENTION

The deaf and the hearing-impaired who cannot hear well enough to use the telephone, use communication terminals to converse via written messages over telephone lines. Such terminals are referred to as telecommunication devices for the deaf, or TDDs, and typically include a typewriter-like alphanumeric keyboard and a display connected to the telephone through a modem (modulator/demodulator).

When characters are typed by a first party on the keyboard of a first terminal, tones corresponding to the characters are transmitted via the modem through the telephone line to a second terminal. At the second terminal, the tones are received by a second modem and converted back to characters to be read by a second party. In this manner, a conversation proceeds by the taking of turns by each of the users in the typing back and forth of TDDs. TDD terminals may also transmit certain control or data characters which henceforth will be generally referred to as text even though they may not result in a visible text display.

The rules for converting text into tones generally follows the Baudot/Weitbrecht protocol in which the transmitted tones include a mark tone of 1,400 Hz. and a space tone of 1,800 Hz. Sequences of marks and spaces provide five bit binary numbers representing a limited set of letters of the alphabet and certain other characters.

The Baudot/Weitbrecht protocol is a simplex protocol meaning that transmissions in both directions along the telephone line cannot be sustained without interference. When information is sought to be sent from both terminals at the same time, the net result is that the transmission will be garbled and the text displayed erroneous.

The transmission of text under the Baudot/Weitbrecht protocol is relatively slow. Characters are transmitted by the modem over the telephone lines at approximately six characters per second. Significantly, many adept typists among TDD communicators are able to type at rates in excess of six characters per second.

The net result is that each TDD may spend a large portion of its time actively transmitting and receiving, making ever present the possibility that two TDDs will be transmitting at the same time. In order to avoid interference in a Baudot/Weitbrecht system, it is therefore common in the United States to type the letters "ga" as an abbreviation for "go ahead" at the end of the text string to indicate to the other user that it is his or her turn to type.

It is often necessary or desirable for a TDD user to call a telephone number that is not equipped with a TDD. These calls may be either emergency or nonemergency, e.g. telephone calls to police, employers, doctors, repair and maintenance workers, relatives and loved ones, etc. In order to make possible telephone calls between a TDD user and a non TDD equipped telephone number, TDD relay centers have been established in many locations. A TDD relay center receives telephone calls from TDD users who request, via TDD, for a relay operator to place a call with a second party for them. The relay operator then calls the second party and tells the second party what the TDD caller is typing. When the second party talks, the operator then types back to the TDD caller. Conversely, a call through the relay center may originate from a non TDD user wishing to communicate with a TDD user. The call then proceeds in the same manner.

Deaf people who can speak may prefer to speak directly to the other party and have the relay operator only transcribe the response. Similarly, a speech impaired caller may prefer to listen for themselves and to have the relay operator simply recite the written half of the conversation. In the previously cited U.S. Pat. No. 5,081,673, a voice carryover bridge is disclosed which may allow a voice or TDD signal in one direction to pass through the relay without intervention by the relay operator. This voice carryover increases the privacy of the callers and reduces the effort required of the relay operator who need not distinguish between two voices and must transcribe or recite only half as much of the conversation. Further, the voice carryover permits communication of information between the parties normally lost from displayed text, such as: identity of the caller, tone, inflection, etc.

Families who have both members who are deaf and that can hear, typically have a TDD and a telephone sitting next to each other both for the convenience of each member of the household and to insure that incoming calls may be correctly answered with the appropriate type of equipment. Clearly this is inefficient in terms of both use of space and duplication of hardware. Institutions and public facilities that wish to receive and transmit both TDD text and voice face a similar issue of duplication.

SUMMARY OF THE INVENTION

The present invention combines a telephone with a TDD in a manner that largely eliminates the need for the user to distinguish between the two devices, thus truly integrating the devices. This integration is accomplished by an intelligent mode switching between a text telephone and a voice telephone and a combination of text and voice telephone (VCO mode) according to the detection and interpretation of the signals received and transmitted and the position of the handset.

Specifically, the combined system includes a handset having a microphone and a speaker, typical of a voice telephone, together with an alphanumeric display and alphanumeric keyboard typical of a TDD. A text detection circuit connected to the phone line produces a text present signal when text signals are on the phone line. This text present signal is communicated to a switch, which in a VCO mode, attenuates at least one signal between the phone line and the handset when the text present signal is received. Typically, the text signals detected will be Baudot tones.

Thus, it is one object of the invention to provide a single telecommunications device that can serve both hearing and deaf individuals receiving and transmitting both text and voice. The invention automatically configures the combined input and output devices so that information on the phone line may be correctly received and responded to invisibly to the user. Thus, the true convenience of a single phone for both sets of users may be realized.

It is another object of the invention to provide a combined telecommunication device well adapted for use with voice carryover relay services where the conversation consists both of voice and text. In the case where the voice carryover feature is used by a hearing individual who can speak, the muting of the microphone prevents ambient noise received from the handset microphone from creating disturbances that might result in erroneous text transmission. In the case of a speech impaired hearing individual, muting of the speaker in the handset prevents the irritating presence of the Baudot tones from requiring the user to put the handset down.

In one embodiment, the text present signal indicates whether the text originated from the keyboard. If so, the attenuation may be immediate, otherwise the attenuation is delayed by a predetermined amount of time.

It is thus another object of the invention to provide a combination telephone/TDD device that operates robustly as a telephone for hearing users. It has been determined that allowing a certain amount of text data to be transmitted to the handset is preferable for intelligibility over the premature muting of voice information. Distinguishing between keyboard originated text and that originated by another TDD allows the speed of attenuation to be tailored to the degree of certainty in the determination that there is text data.

The attenuation may be continued for a predetermined time after the text data is no longer detected.

The present invention also recognized that premature reconnection of the handset may be confusing to the user and thus it is another object of the invention to eliminate premature reconnection of the handset to the phone lines upon the cessation of text data.

The microphone of the handset may be reconnected before the speaker is reconnected after cessation of text data.

It is thus another object of the invention to accommodate a speaker's apparent impulse to respond to a text message immediately upon recognizing a sentence's end but in any case before reconnecting the speaker to the phone line, the latter reconnection which may be distracting to the listener.

The switch interposed between the handset and phone line may operate in three modes: a TEXT mode, a VOICE mode and a VCO mode. The switch may communicate with a handset cradle switch to automatically change from the TEXT mode to the VCO mode when a handset use signal from that cradle indicates that the handset has been removed from the cradle. Further the switch may automatically change from VOICE mode to VCO mode when the text present signal indicates that text is present on the phone line. A mode key may also be used to switch between modes.

Thus, it is another object of the invention to provide special purpose operating modes convenient for particular uses of the telecommunications device but nevertheless to allow automatic transition between these modes based on information contained in the user's actions (e.g., in the user's lifting of the handset) and those of the other communicating party (e.g., the receipt of text data) without user intervention.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figure 1:
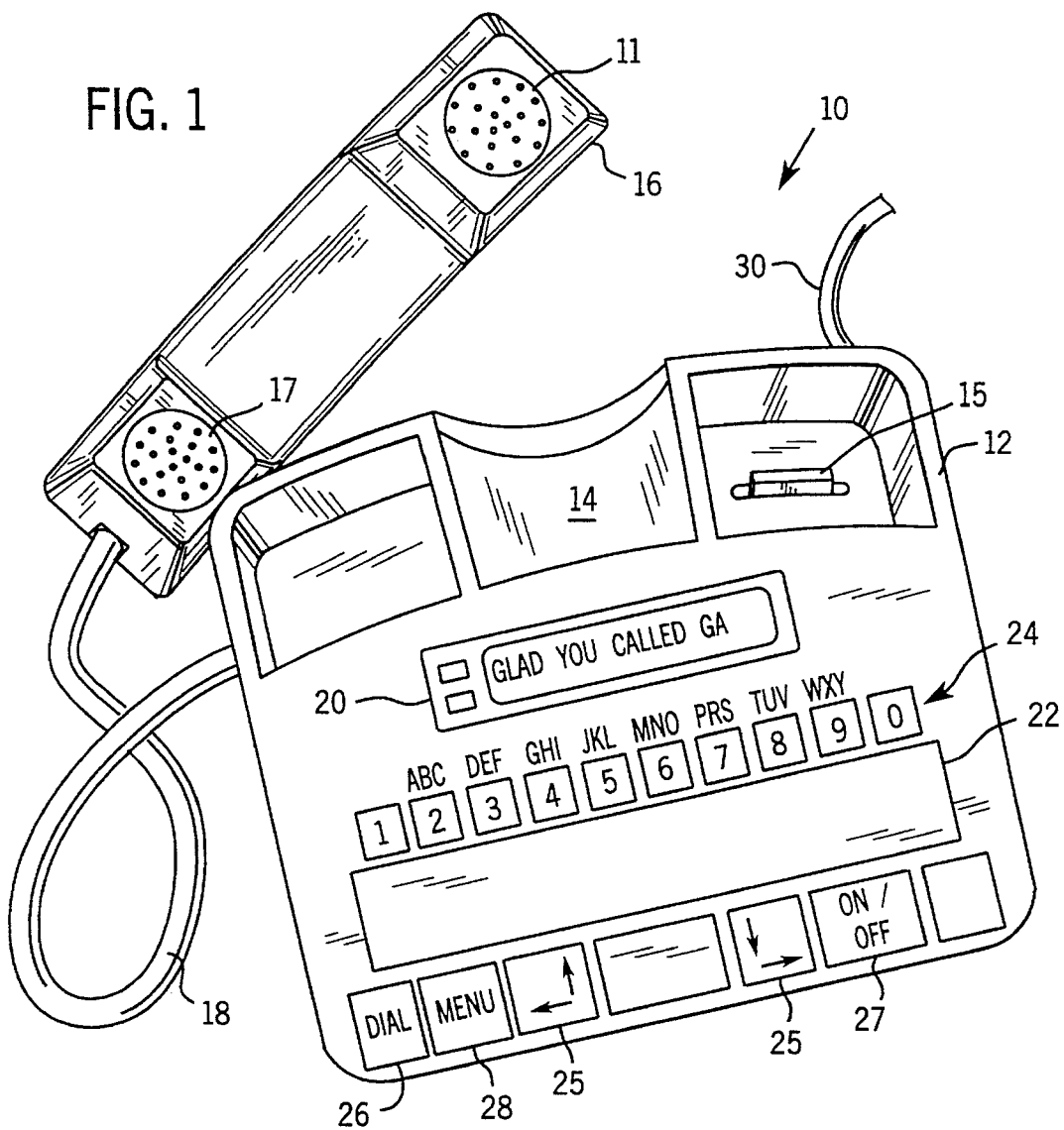
FIG. 1 is a perspective view of a unified TDD/telephone per the present invention.

Referring to FIG. 1, a unified TDD/telephone 10 has a housing 12 exposing at its rearmost upper surface, a cradle 14 supporting a conventional telephone handset 16 having a mouthpiece microphone 17 and an earpiece speaker 11 as is well understood in the art. The microphone 17 and speaker 11 of the handset 16 are connected by a flexible electrical cable 18 to circuitry within the housing 12 as will be described below. When the handset 16 is in place in the cradle 14, it depresses a cradle switch 15 providing an electrical signal indicating that the handset 16 is in place in the cradle 14. The term handset, as used herein should be considered to embrace not only traditional handsets intended to be held next to the head but also their equivalent structure such as wearable microphone/headphone combinations and stationary microphone speaker sets such as are found in speaker phones and the like.

A standard QWERTY keyboard 22 formed of rows and columns of electrical pushbutton keys is presented at the frontmost upper surface of the housing 12. Three rows of the keyboard 22 comprise letters. A fourth, top row 24 comprises the Arabic numerals from 0 to 9, much in the fashion of a standard typewriter or computer keyboard.

Between the cradle 14 and the keyboard 22 and tipped upward and forward so as to be visible to a user of a keyboard 22 is a two line liquid crystal display LCD 20 suitable for the display of both numbers and letters.

Special "menu", "dial", and "on/off" and cursor pushbuttons 28, 26, 27 and 25 are positioned to the side of the keyboard 22. The unified TDD/telephone 10 is connected to the phone lines 30 by means of a standard phone jack (not visible in FIG. 1) at the rear of the housing 12.

When the unified TDD/telephone 10 is used as a telephone, the handset 16 may be removed from the cradle 14 and voice conversations undertaken. When used as a TDD, received text is displayed on the display 20 and responses are typed by the user on keyboard 22. The display may also display certain status messages as will be described and upon pressing of the menu key 28, provides a set of menus on the display 20 allowing the user to access advanced features, such as a call timer, by use of the cursor keys 25 which maneuver a cursor on the display 20 to select the desired feature.

Dialing of the unified TDD/telephone 10 in either case is accomplished by the use of the numeric key row 24 which has imprinted above each number the three letter series found on a standard telephone for use in cases where the telephone number includes letters. Distinguishing between the use of the upper keyboard row 24 for dialing or for entering numeric characters is done by a dialing key 26 which may be activated by the user and which displays a dialing symbol on the display 20 to indicate that the numeric key row 24 is being used for dialing rather than TDD characters to be transmitted.

Figure 2:
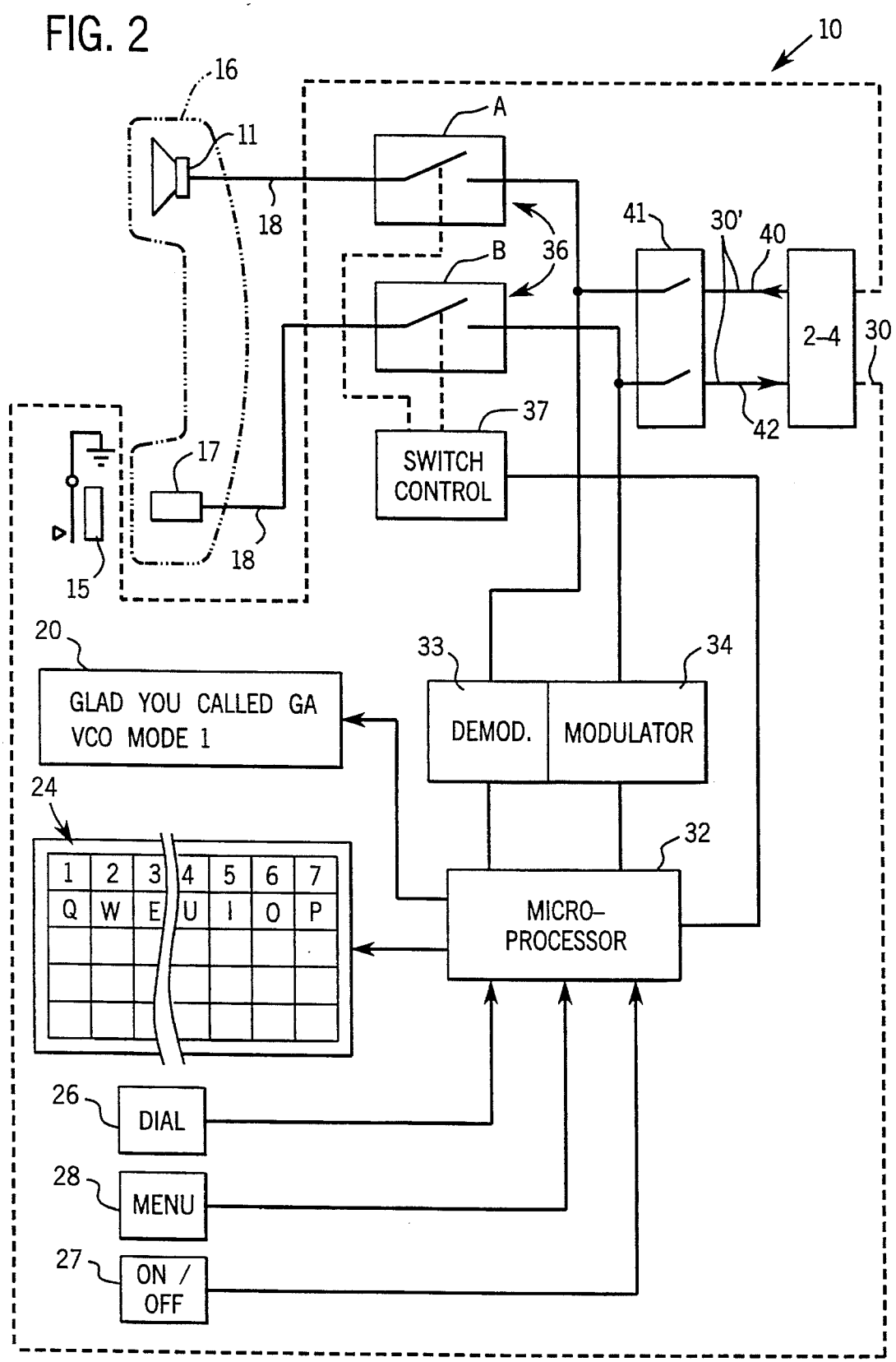
FIG. 2 is a schematic block diagram of the major components of the unified TDD/telephone of FIG. 1 showing the connections of an internal microprocessor to the various components of the device of FIG. 1 including a mode switch for routing text and voice.

Referring now to FIGS. 1 and 2, the display 20 and keyboard 22 are connected with a microprocessor 32 which receives digital data from the keyboard 22 and which provides data to be displayed on the display 20 as is well understood in the art. Microprocessor 32 also receives electrical signals from the menu key 28, the dialing key 26, the on/off key 27 and the cradle switch 15.

The microprocessor 32 may receive data from the phone lines 30. Phone lines 30 first pass through a two-to-four (2–4) line converter which converts the standard two line phone lines 30 to its four line equivalent 30' having a separate received signal line 40, along which signals may be received by the unified TDD/telephone 10, and a separate transmitted signal line 42 along which signals may be transmitted from the unified TDD/telephone 10 prior to passing out of the housing 12. The transmitted signal line 42 and the received signal line 40 next pass through a relay 41 which disconnects both from the TDD/telephone 10 when the TDD/telephone 10 is off, i.e., no call is in progress.

The microprocessor receives signals from the received signal line 40, after they pass through a demodulator 33 which converts the Baudot tones to voltage levels readable by the microprocessor 32. The output of the demodulator 33 provides a signal that indicates to the microprocessor whether there is text present on the phone lines 30, and also allow the microprocessor to decode any such text according to conventional methods. Generally, text may be distinguished from voice by its spectral content, the uninterrupted duration of the signal within a particular spectral band, and in the case of text, whether the decoded tones map to legal characters under the specific data communications protocol in use.

The microprocessor 32 may also transmit data on the phone lines 30 via a modulator 34 which converts voltage levels produced by the microprocessor 32 to Baudot tones to be transmitted to the phone lines 30 via transmitted signal line 42. The modulator 34 may provide not only Baudot tones needed for text communication over the phone lines 30 but also the dual tone multi-frequency modulation (DTMF) required to dial a telephone.

A switch unit 36 provides two independent single pole, single throw switches A and B as implemented in solid state circuity well known in the art. The positions of each switch A and B may be independently moved between an open and closed position by switch controls unit 37 which receives commands from the microprocessor 32. When closed, switch A connects the received signal line 40 directly to the speaker 11. When open, the switch A provides a high impedance path between the received signal line 40 and the speaker 11 muting the sound received by the user but providing some residual volume as has been found useful as a audible cue to the user indicating the receipt of data and the functioning of the handset.

Likewise, when closed, switch B connects the transmitted signal line 42 directly to the microphone 17. When open, the switch B provides a high impedance path between the transmitted signal line 42 and the microphone.

Each switch A and B may be operated together or separately by means of switch control unit 37 receiving a signal from microprocessor 32. Thus, it will be apparent that under the control of microprocessor 32, voice signals may be independently switched between phone lines 30 and the speaker 11 and the microphone 17

Figure 3:
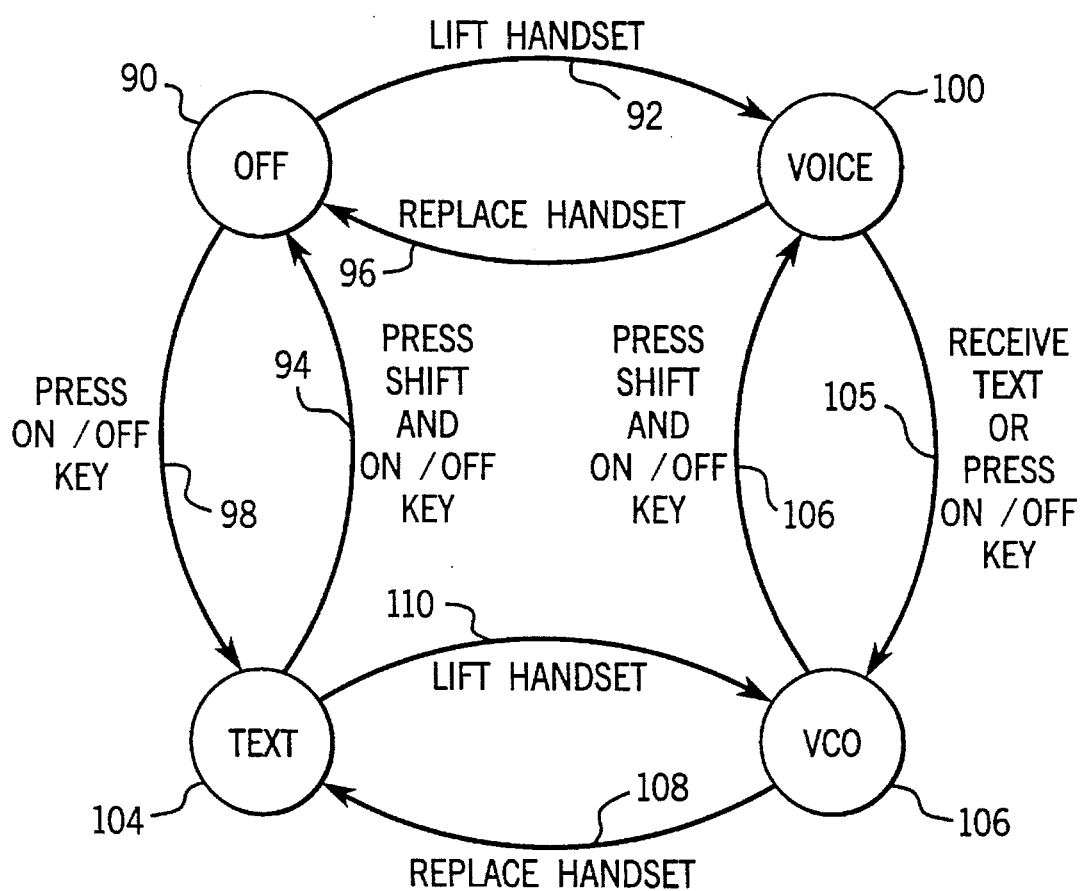
FIG. 3 is a state chart showing the states of a program executed by the microprocessor of FIG. 2 in determining the appropriate state of the switch of FIG. 2.

Referring now to FIGS. 2 and 3, the microprocessor 32 includes a program for controlling the switch unit 36 according to the state of the unified TDD/telephone 10 in one of four modes: OFF, VOICE MODE, TEXT MODE, and VCO MODE (voice carry-over). The position of the switches A and B are changed according to the particular mode as indicated in Table I.

TABLE 1

| Mode | Switch A | Switch B |
| --- | --- | --- |
| OFF | NA | NA |
| VOICE MODE | closed | closed |
| TEXT MODE | open | open |
| VCO MODE | switched | switched |

The first mode is the OFF mode 90 where the relay 41 is open and the TDD/telephone 10 is disconnected entirely from the phone line 30. The TDD/telephone 10 starts in this mode when it is first powered-up or when it is idle prior to receiving the phone call or after a call is terminated. Switches A and B arbitrarily remain in a closed position.

The TDD/telephone 10 moves from the OFF mode 90 to a VOICE MODE 100 when the handset is lifted as indicated by state change arrow 92. In the VOICE MODE 100 the switch unit 36 is simply configured to connect the handset 16 to the phone lines 30 for telephone operation. Thus, if one is intending to make a voice telephone call or is answering the phone unaware of whether the source of the incoming call is a TDD or a telephone, the unified TDD/telephone 10 will always moves first to the VOICE MODE 100. Replacing the handset in the VOICE mode 100 causes the TDD/telephone 10 to move to the OFF mode, hanging up the phone as indicated by state change arrow 96.

If the on/off key 27 is pressed in VOICE MODE 100, the switch moves to VCO mode 106 indicated by state change arrow 105. This latter situation may arise when a hearing user detects that a newly received call is a TDD call based on the presence of a limited number of Baudot tones.

If the call is a voice call, the TDD/telephone 10 will remain in VOICE MODE 100 and the call may be answered. If however, a predetermined amount of incoming text is detected, per a text detector circuit implemented in the programming of the microprocessor 32, the TDD/telephone 10 will switch to VCO MODE 106 as indicated by that state change 105. Thus, no special training is required for a hearing individual to use the TDD/telephone as a telephone in most situations. VOICE mode 100 can be returned to by pressing the shift key and the on/off key 27.

In contrast, if one wishes to make a TDD call, the on/off key 27 may be pressed without removing the handset 16, thereby causing the unified TDD/telephone 10 to move from the OFF mode 90 to TEXT MODE 104 as indicated by state change arrow 98. Pressing the shift key (not shown) and the on/off key 27 together returns on to the OFF mode 90 terminating the call. This combination of key strokes prevents accidental hanging up of the TDD/telephone 10 while typing.

Only in TEXT MODE 104 will an automatic TDD identification signal be transmitted by the unified TDD/telephone 10 for use for example by emergency services after the dialing of a number. Such an automatic identification signal serves to identify the TDD/telephone 10 as a TDD to remote devices having certain call recognizing circuitry and thus to eliminate time wasted determining the call type. In VOICE mode 100, where the TDD/telephone is presumably calling a voice telephone, an automatic identification signal, which is in the form of a text signal, would be inappropriate and irritating. The automatic identification signal is generated by the microprocessor 32 and may consist of one or more text characters recalled from the microprocessor's memory.

The VCO MODE 106 may also be reached from the TEXT MODE 104 by lifting the handset 16, after TEXT MODE 104 has been entered, as indicated by state change arrow 110. Faint Baudot tones will be heard on the handset by the hearing individual indicating that a TDD message is still incoming, if this in fact is the case. The experienced user will be able to use the TDD/telephone 10 in this mode with a voice relay as has previously been described, as a result of a switching sequence performed by switch unit 36 to be described in more detail below. Replacing the handset, while in VCO mode 106 returns the user to the TEXT mode 104, as indicated by state change arrow 108.

The VCO MODE 106 is useful both for hearing individuals who are speech impaired and wish to use a voice carry over relay service as has been described or for deaf individuals that wish to use a relay service permitting them to speak directly to the opposite party yet to receive responses on the display 20.

The name of the current mode is displayed on the display 20 by microprocessor 32.

Referring to TABLE 2, in the VCO mode the handset 16 and more specifically, the microphone 17 and speaker 11 of the handset 16 are switchable depending on the presence of text data on the phone lines 30 and the source of that data as either external, from a remote TDD connected on the phone lines 30, or internal from the keyboard 22.

TABLE 2

|  | Switch B | Switch A |
| --- | --- | --- |
| Text Present (external source) | open after three characters in 1.5 seconds | open after three characters in 1.5 seconds |
| External Source Text No Longer Present | close after 0.3 seconds | close after 2.5 seconds |
| Text Present (internal source) | open immediately | open immediately |
| Internal Source Text Non Longer Present | close after 0.3 seconds | close after 2.5 seconds |

The voice frequency band and the text frequency band overlap and thus the demodulator 33 used by the microprocessor 32 to develop a text present signal will occasionally indicate apparent Baudot tones when no text is present on phone lines 30. Even with further processing, occasional false text detection may disrupt conversation on the TDD/telephone in VOICE MODE 100. This possibility is eliminated by delaying any opening of the switches A and B, to mute text data and prevent corruption of text data by sounds received by microphone 17, unless three characters have been received in a rolling window of 1.5 seconds. Shorter detection thresholds could be used however, it has been determined that it is preferable for intelligibility to admit some text signals to the handset 16 rather than prematurely truncate voice communications over the handset 16.

This text detection problem only occurs if the source of the text is external to the TDD/telephone 10. If the source of the text is internal, i.e., from the keyboard 22, then detection may be made immediately by detecting keyboard signals instead of text on the phone lines 30 and there is no delay in the opening of switches A and B.

The closing of the switches A and B can also be disruptive, Such switching can cause clicks in the handset speaker 11 and changes in the background noise level which may be distracting. For this reason and given that the transmission of text occurs at discrete and separated intervals, it is necessary, in any case, to delay the closing of the switches after the last text character has been detected to avoid needless switching activity. Thus, the re-closing of switches A and B is delayed in both the case of internal and external source text.

Nevertheless, it has been determined that a user of the TDD/telephone 10 watching the text message on the display 20 may be able to anticipate the conclusion of a message in much less time that this delay or may wish to respond more quickly that this dely would allow. Thus, the microphone 17 and speaker 11 are independently switched with the microphone switch B closed earlier to allow rapid response, but the speaker switch A closed later to prevent the disruptive clicking. Implicit in this design is the recognition that serious corruption of text data by the microphone signal produced by the user's response is unlikely in most calling situations.

The above description has been that of a preferred embodiment of the present invention. It will occur to those that practice the art that many modifications may be made without departing from the spirit and scope of the invention. For example, the attenuation of the signals to and from the handset may be such as to completely block the signals and thus the term attenuation used herein should be considered to include complete blocking of the signals. In order to apprise the public of the various embodiments that may fall within the scope of the invention, the following claims are made.

We claim:

1. A telecommunication device for the deaf to communicate on a telephone line supporting voice and text signals comprising:

a handset having a microphone and a speaker;

an alphanumeric display;

a text detection circuit connected to the phone line and producing a text present signal when text signals are on the phone line; and a switch communicating with the text detection circuit to, in a voice carry-over mode, attenuate at least one signal between the phone line and the handset speaker when the text present signal is received; and further including an alphanumeric keyboard and wherein the text detection circuit communicates with the alphanumeric keyboard so that the text present signal further indicates if the text signals on the phone line originated from the alphanumeric keyboard; and wherein the switch includes a delay timer delaying the attenuation of the signal between the phone line and the handset for a predetermined time only if the text present signal indicates that the text signals on the phone line did not originate from the alphanumeric keyboard.

2. A telecommunication device for the deaf to communicate on a telephone line supporting voice and text signals comprising:

a handset having a microphone and a speaker;

an alphanumeric display;

a text detection circuit connected to the phone line and producing a text present signal when text signals are on the phone line; and a switch communicating with the text detection circuit to, in a voice carry-over mode, attenuate at least one signal between the phone line and the handset when the text present signal is received; wherein the switch further includes a delay timer delaying the reconnecting of the handset and phone line for a predetermined period after the text present signal is no longer available.

3. The telecommunications device of claim 2 wherein the switch includes multiple contacts for independently switching the microphone and speaker of the handset and wherein the delay timer provides different predetermined delay periods for the reconnection of the microphone and the speaker of the handset to the phone line.

4. The telecommunications device of claim 3 wherein the predetermined delay period is shorter for the reconnection of the microphone than the reconnection of the speaker.

5. A telecommunication device for the deaf to communicate on a telephone line supporting voice and text signals comprising:

a handset having a microphone and a speaker;

an alphanumeric display;

a text detection circuit connected to the phone line and producing a text present signal when text signals are on the phone line; and a switch communicating with the text detection circuit to, in a voice carry-over mode, attenuate at least one signal between the phone line and the handset when the text present signal is received;

a mode key producing a mode change signal causing a change in an operating mode of the switch between a VOICE mode and the voice carry-over mode;

wherein the switch does not attenuate the signal between the phone line and the handset when the text present signal is received, when the switch is in a VOICE mode;

a handset cradle switch providing a handset use signal indicating that the handset has been removed from the handset cradle and causing a change in an operating mode of the switch between a VOICE mode and the voice carry-over mode;

wherein the switch attenuates the signal between the phone line and the handset regardless of whether the text present signal is received, when the switch is in a TEXT mode.

6. A telecommunication device for the deaf to communicate on a telephone line supporting voice and text signals comprising:

a handset having a microphone and a speaker;

a handset cradle switch providing a handset use signal indicating that the handset has been removed from a cradle;

an alphanumeric display; and a switch communicating with a text detection circuit so as to selectively connect the handset and the alphanumeric display to the phone line so as to transfer voice signals between the phone line and only the handset when the switch is in a VOICE mode, to transfer text signals between the phone line and only the alphanumeric display when the switch is in a TEXT mode, and to transfer both voice signals and text signals between the alphanumeric display and the handset and the phone line when the switch is in a voice carry-over mode;

the switch further communicating with the handset cradle switch to change from the TEXT mode to the voice carry-over mode when the handset use signal indicates that the handset has been removed from the cradle.

7. The telecommunications device of claim 6 wherein the switch returns from the voice carry-over mode to the TEXT mode when the handset use signal indicates that the handset has been replaced on the cradle.

8. A telecommunication device for the deaf to communicate on a telephone line supporting voice and text signals comprising:

a handset having a microphone and a speaker;

an alphanumeric display; and a text detection circuit connected to the phone line and producing a text present signal when text signals are on the phone line;

a switch communicating with the text detection circuit so as to selectively connect the handset and the alphanumeric display to the phone line so as to transfer voice signals between the phone line and only the handset when the switch is in a VOICE mode, to transfer text signals between the phone line and only the alphanumeric display when the switch is in a TEXT mode, and to transfer both voice signals and text signals between the alphanumeric display and the handset and the phone line when the switch is in a voice carry-over mode;

the switch further communicating with the text detection circuit to change from the VOICE mode to the voice carry-over mode when the text detection circuit indicates that text signals are present on the the telephone line.

9. The telecommunications device of claim 8 further including a mode key and wherein the switch also changes from the VOICE mode to the voice carry-over mode when the mode key is pressed.

10. The telecommunications device of claim 8 further including a mode key and wherein the switch returns from the voice carry-over mode to the VOICE mode when the mode key is pressed.

* * * * *